United States Patent Office 3,315,457
Patented Apr. 25, 1967

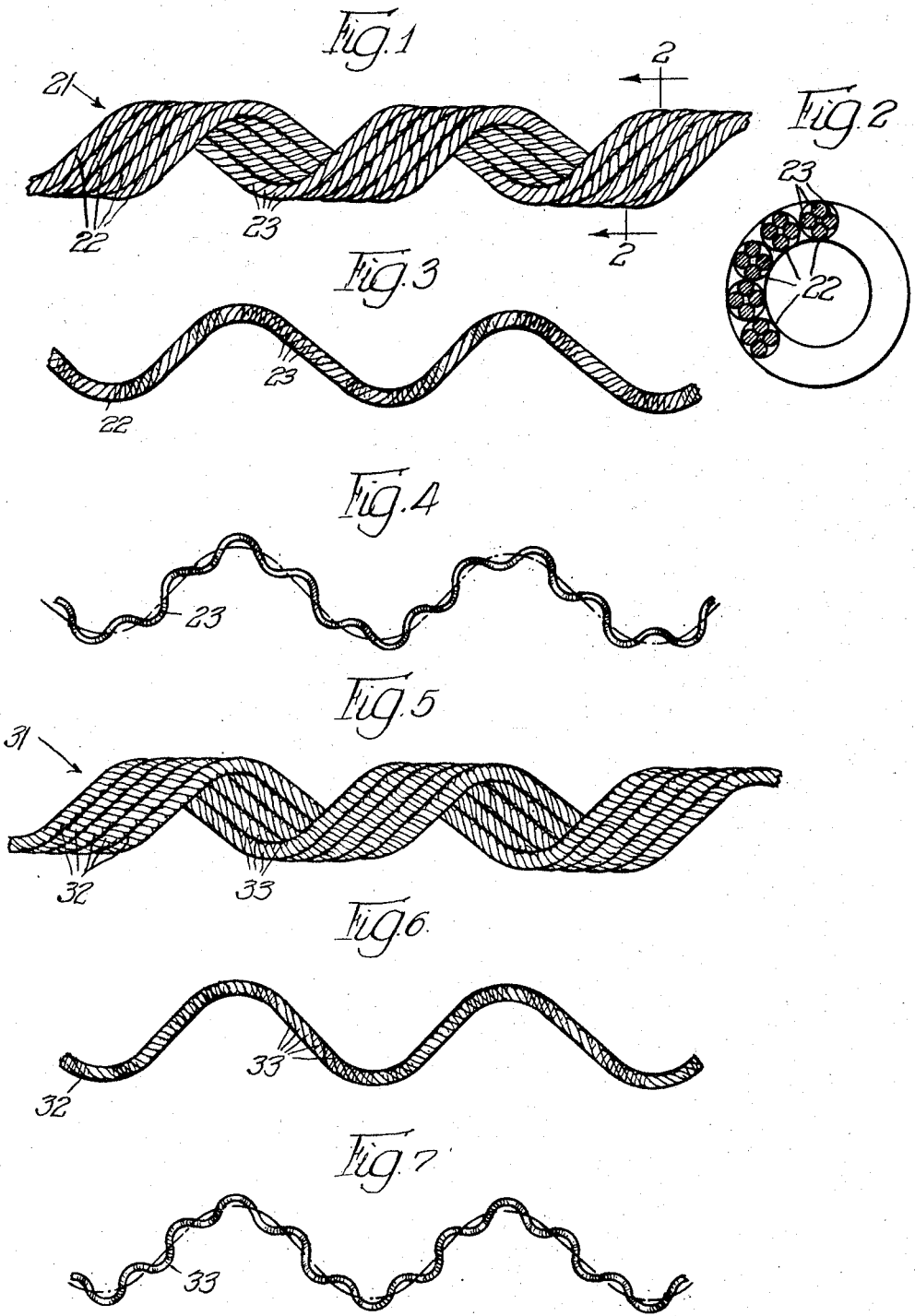

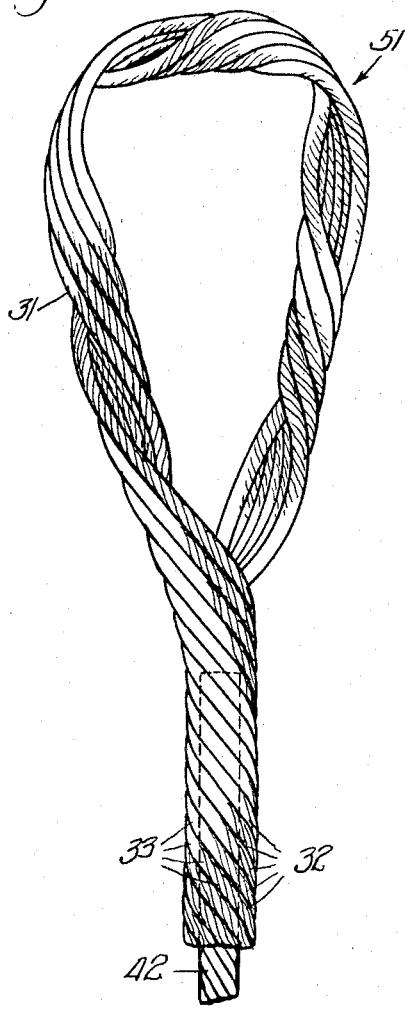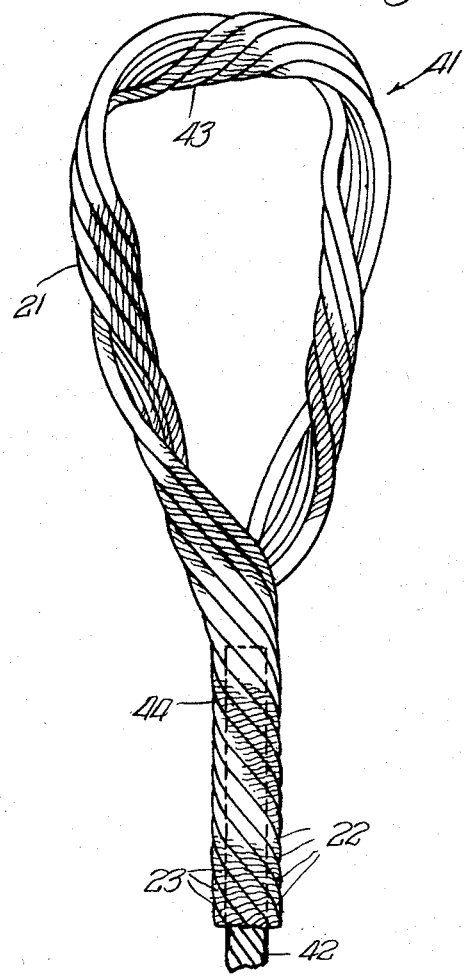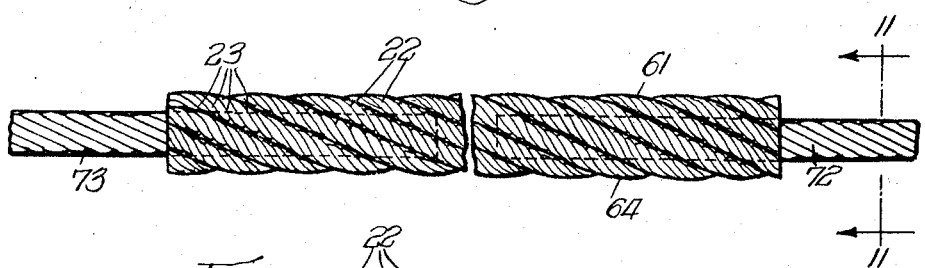

3,315,457
APPLIANCE FOR LINEAR BODIES
Howard F. Stirn, Cleveland, Ohio, assignor to Preformed Line Products Company, Cleveland, Ohio, a corporation of Ohio
Filed Feb. 25, 1965, Ser. No. 435,269
8 Claims. (Cl. 57—145)

The invention pertains to appliances for use with linear bodies such as electrical transmission lines, cables, and the like. Specifically, this invention relates to the utilization of helically preshaped elements for dead-ends splices or other appliances adapted to armor or exert a grip on a linear body. Such appliances are shown, for example, in Patent No. 2,761,273, issued Sept. 4, 1956, to Thomas F. Peterson, entitled, "Dead Ends for Linear Bodies." and in Patent No. 3,032,964, issued May 8, 1964, to Thomas F. Peterson, entitled, "Helically-Preformed Splices and Method of Splicing."

The appliances shown in the Peterson patents referred to are adapted to exert an axial grip on a linear body by providing a plurality of helically preshaped elements arranged in a bridging relationship so as to form a helical band, the internal diameter of which is smaller than the diameter of the linear body to which it is applied. As a result of this arrangement, these appliances exert uniform radial or centripetal pressure upon the linear body to grip and hold the linear body against slippage under tensile load. The appliances disclosed in the Peterson patents represent a significant advance over the prior art, and as a result enjoy an extraordinary measure of commercial success.

As indicated, the practice has been to make up the helical band from a plurality of helically preshaped elements. Until the present invention, each element has been a unitary length of material such as round rod or wire stock which has been preshaped into the requisite helical configuration. The individual helical elements are then arranged together in a banded or bridging relationship.

In accordance with the present invention, it has been found that the ultility and versatility of such helical appliances are enhanced by employing helically preshaped elements composed of stranded wire. Accordingly, it is a primary object of the present invention to provide an appliance for linear bodies wherein the helically preshaped elements are composed of stranded wire.

For example, by utilizing helical elements composed of stranded wire in a dead end, the life of the bight portion is greater under cyclic tensile loading and repeated impact, and the appliance is more easily bent in the field to form the dead-end bight portion.

Another advantage of employing helical elements composed of stranded wire is the anti-rotation characteristic of the gripping portion of the appliance under tensile load when the element is helically shaped to a lay direction opposite to that of the wire strands composing the element.

In addition, the use of stranded helical elements provides a capability for producing appliances of various sizes from a stock of single size wire strand.

These and other features and objects will be apparent from the following description and the accompanying drawings.

In the drawings:

FIGURE 1 is a side view in elevation of one form of half-lay in accordance with the present invention.

FIGURE 2 is a cross-sectional view taken at 2—2 of FIGURE 1.

FIGURE 3 is a side view in elevation of one of the helical elements comprising the half-lay of FIGURE 1.

FIGURE 4 is a side view in elevation of one of the wire strands comprising the helical element of FIGURE 3.

FIGURE 5 is a side view in elevation of another form of half-lay in accordance with the present invention.

FIGURE 6 is a side view in elevation of one of the helical elements comprising the half-lay of FIGURE 5.

FIGURE 7 is a side view in elevation of one of the wire strands comprising the helical element of FIGURE 6.

FIGURE 8 is a side view in elevation of one form of dead-end in accordance with the present invention.

FIGURE 9 is a side view in elevation of another form of dead-end in accordance with the present invention.

FIGURE 10 is a side view in elevation of a splice in accordance with the present invention.

FIGURE 11 is a cross-sectional view taken at 11—11 of FIGURE 10.

As used herein, the term "half-lay" refers to a helical band dimensioned such that when wrapped together with a helical band of equal dimensions will form a complete tubular envelope or "whole-lay."

Referring now to FIGURES 1 and 2, there is shown one form of half-lay 21 in accordance with the present invention. The half-lay 21 is comprised of a plurality of linear elements 22, in this instance five linear elements, which have each been helically preshaped to the same uniform open pitch with the same internal diameter and hand-of-lay. As depicted, the helical elements 22 are arranged together in a mutually-conforming, bridging relationship so as to form a helical band.

Each of the helical elements 22, in turn, consists of a plurality of wire strands 23, in the instance four wire strands, which have been mutually intertwisted. One such helical element 22 is depicted in FIGURE 3, and in FIGURE 4 one of the wire strands 23 is depicted in the configuration it assumes within the helical element 22.

As illustrated in FIGURES 1, 3 and 5, the strands 23 are intertwisted in a hand-of-lay which is the same as the hand-of-lay of the helical elements 22 and the completed half-lay 21.

Referring now to FIGURE 5, there is shown another form of half-lay 31 in accordance with the present invention also comprising five linear wire stranded elements 32 which have been helically preshaped to the same uniform open pitch with the same internal diameter and hand-of-lay and grouped together in a conforming bridging relationship so as to form a helical band. One of the helically preshaped elements 32 is depicted in FIGURE 6, and one of its constituent wire strands is depicted in FIGURE 7.

The half-lay 31 of FIGURE 5 differs from the half-lay 21 of FIGURE 1 only in the respect that the strands 33 are intertwisted in a hand-of-lay which is opposite to the hand-of-lay of the helical elements 32 and the completed half-lay 31.

It should be understood that the constituent wire strands in a particular helical element can all be of the same metal and diameter or, if found desirable, the various strands can be of various metals or sizes. Moreover, the constituent strands can be of materials other than metal or plastic, for example.

Referring now to FIGURE 8, there is illustrated one form of dead-end 41 in accordance with the present invention for securing or anchoring the end of a cable 42 or other linear body. The dead-end 41 comprises a half-lay 21 of the type shown in FIGURE 1 which has been applied to the end portion of the cable 42 in accordance with the teachings of the Peterson Patent No. 2,761,273. Specifically, one end portion of the half-lay 21 has been wrapped about the cable 42, the central portion of the half-lay 21 has been return bent to form the bight 43, and the remaining end portion of the half-lay 21 has been wrapped about the cable 42 so that the end of the cable 42 is enclosed within a tubular envelope 44 formed of the two end portions of the half-lay 21 wrapped in a 180° phase relationship with one another. The internal diameter of the half-lay 21 must be slightly less than the diameter of the cable 42 so that the cable is tightly gripped by the tubular envelope 44 and restrained against axial movement. As described in the Peterson Patent No. 2,761,273, the cable 42 can also be encased within the bight portion 43 to further enhance the grip exterted by the dead-end 41 on the cable.

It will be noted that in FIGURE 8, both the helical elements 22 and their constituent strands 23 conform to the hand-of-lay of the cable 42, thereby promoting maximum frictional contact between the dead-end 41 and the cable 42.

Referring to FIGURE 9, there is illustrated another form of dead-end 51 in accordance with the present invention. The dead-end 51 differs from the dead-end 41 only in the respect that the dead-end 51 is formed from a half-lay 31 of the type illustrated in FIGURE 5. Thus, in FIGURE 9, the helical elements 32 conform to the hand-of-lay of the cable 42 but the constituent strands 33 are of an opposite hand-of-lay than the cable 42. It has been found that with the strands 33 in an opposite hand-of-lay relationship with respect to the cable 42, any tendency of the cable 42 to rotate within the dead-end 51 when a tensile load is placed on the cable 42 is virtually eliminated. This, of course, is a salient advantage in many dead-end applications.

Whether formed of a half-lay of the FIGURE 1 type or the FIGURE 5 type, in advantageous characteristic of dead-ends formed of stranded helical elements is that the bight portion is more easily formed in the field due to the tendency of the constituent strands of the helical elements to redistribute slightly to present less resistance when bending forces are applied to the half-lay. Moreover, it has been found that the bight portions of such dead-ends experience a longer life under tensile loading and repeated impact.

Referring now to FIGURES 10 and 11, there is illustrated a splice 61 in accordance with the present invention joining together the ends of two cables 72 and 73. The splice 61 consists of two half-lays 21 of the type depicted in FIGURE 1 which have been wrapped together in a 180° phase relationship about the adjoining ends of the cables 72 and 73 so as to form a tubular envelope or whole-lay 64. The splice 61 can also be formed by applying the requisite number of mutually conforming helical elements 22 directly to the adjoining ends of the cables 72 and 73 to form the tubular element 61 without first arranging the elements 22 into two half-lays. In either event, the helical elements 22 should have an internal diameter slightly less than the diameter of the cables 72 and 73 so that the adjoining ends of the cables will be tightly gripped and restrained against axial movement within the splice 61.

As depicted in FIGURE 10, both the helical elements 22 and their constituent strands 23, are of the same hand-of-lay as the cables 72 and 73, thereby promoting maximum frictional contact of the splice 61 with the cable end portions enclosed therein. It is apparent that the splice 61 may also be comprised of helical elements of the type depicted in FIGURES 5, 6, and 7 such that the helical elements would be of the same hand-of-lay as the cables 72 and 73 but the constituent strands of the helical elements would be of opposite hand-of-lay from that of the cables 72 and 73, thereby minimizing any tendency of the cables to rotate within the splice 61 when subjected to tensile load.

To increase the holding capability of the helical elements when used in dead-ends or splices, a suitable grit or abrasive, such as aluminum oxide, caborundum, or the like, usualy in a suitable liquid vehicle, may be applied to the contact surfaces.

In some cases, the stranded helical elements may be employed merely to encase or armor a linear body without exerting a centripetal grip. In such cases, the internal diameter of the helical elements need not be less than the diameter of the linear body. However, whether used to exert a centripetal grip as in the case of dead-ends and splices, or merely to encase the linear body, the pitch length of the stranded helical elements should be sufficient to permit their application to the linear body from the side thereof without exceeding the elastic limits of the stranded helical elements.

The degree of resilience and flexibility of the stranded helical elements is a matter of design. It should be noted, however, that an adequate degree of resilience is required where the stranded helical elements must exert a grip on the linear body.

Finally, it should be noted that it may be found desirable to mix stranded and non-stranded helical elements in some applications.

Although certain specific embodiments and specific terminology have been used in illustrating and describing the invention, it is to be understood that this is merely by way of example and in no manner to be construed as a limitation. It is contemplated that certain modifications may be made within the scope of the claims without departing from the spirit of the invention.

What is claimed is:

1. A gripping device for linear bodies comprising a plurality of mutually conforming helical elements preshaped to a uniform open pitch and to an internal diameter less than the outside diameter of such linear body for application to the linear body from the side thereof in gripping relation therewith, at least one of said helical elements comprising strands intertwisted in the same hand-of-lay as said helical element, said intertwisted strands being movable relative to one another an amount sufficient to enable said strands to shift slightly when bending forces are applied to said helical element.

2. A gripping device for linear bodies comprising a plurality of mutually conforming helical elements preshaped to a uniform pitch and to an internal diameter less than the outside diameter of such linear body for application to the linear body from the side thereof in gripping relation therewith, at lease one of said helical elements comprising strands intertwisted in a hand-of-lay opposite to said helical element.

3. A gripping device for linear bodies comprising a plurality of mutually conforming helical elements having the same hand-of-lay and preshaped to a uniform open pitch and to a predetermined internal diameter for application to the linear body from the side thereof in gripping relation therewith, said plurality of helical elements being grouped in a bridging relationship so as to form a helical band, at least one of said helical elements comprising strands intertwisted in the same hand-of-lay as said helical element, said intertwisted strands being movable relative to one another an amount sufficient to enable said strands to shift slightly when bending forces are applied to said helical band.

4. A gripping device for linear bodies comprising a plurality of mutually conforming helical elements having the same hand-of-lay and preshaped to a uniform open pitch and to a predetermined internal diameter for application to the linear body from the side thereof in gripping relation therewith, said plurality of helical elements being grouped in a bridging relationship so as to form a helical band, at least one of said helical elements comprising strands intertwisted in a hand-of-lay opposite to said helical element, said intertwisted strands being movable relative to one another an amount sufficient to enable said strands to shift slightly when bending forces are applied to said helical band.

5. A gripping device for linear bodies comprising a helical band composed of helically preshaped elements of an internal diameter less than the outside diameter of such linear body and of a pitch and flexibility adapting said helical band to application to the linear body from the side thereof without exceeding the elastic limit of said elements, each of said elements being composed of strands intertwisted in the same hand-of-lay as said element, said intertwisted strands being movable relative to one another an amount sufficient to enable said strands to shift slightly when bending forces are applied to said helical band.

6. A gripping device for linear bodies comprising a helical band composed of helically preshaped elements of an internal diameter less than the outside diameter of such linear body and of a pitch and flexibility adapting said helical band to application to the linear body from the side thereof without exceeding the elastic limit of said elements, each of said elements being composed of strands intertwisted in an opposite hand-of-lay as said element.

7. An appliance for linear bodies comprising a plurality of mutually conforming helical elements having the same hand-of-lay and preshaped to a uniform open pitch for application to such linear body from the side thereof, said plurality of helical elements being grouped in a bridging relationship so as to form a helical band, each of said plurality of helical elements comprising strands intertwisted in the same hand-of-lay as said helical element, said intertwisted strands being movable relative to one another an amount sufficient to enable said strands to shift slightly when bending forces are applied to said helical band.

8. An appliance for linear bodies comprising a plurality of mutually conforming helical elements having the same hand-of-lay and preshaped to a uniform open pitch for application to such linear body from the side thereof, said plurality of helical elements being grouped in a bridging relationship so as to form a helical band, each of said plurality of helical elements comprising strands intertwisted in a hand-of-lay opposite to said helical element.

References Cited by the Examiner
UNITED STATES PATENTS

| | | | |
|---|---|---|---|
| 2,918,783 | 12/1959 | Little | 57—144 |
| 2,943,135 | 6/1960 | Bertling | 57—145 |
| 2,998,696 | 9/1961 | Payer | 57—145 |
| 3,018,319 | 1/1962 | Quayle | 174—79 |
| 3,032,964 | 5/1962 | Peterson | 57—142 X |
| 3,080,631 | 3/1963 | Ruhlman | 57—145 X |
| 3,134,842 | 5/1964 | Bethea | 24—129 X |
| 3,183,658 | 5/1965 | Peterson | 57—142 X |
| 3,190,065 | 6/1965 | Little | 57—145 |
| 3,267,658 | 8/1966 | Schlein | 57—145 |

FRANK J. COHEN, *Primary Examiner.*

D. E. WATKINS, *Assistant Examiner.*